(12) United States Patent
Yamamoto

(10) Patent No.: US 8,879,610 B2
(45) Date of Patent: Nov. 4, 2014

(54) APPARATUS AND METHOD FOR CHANGING A CLOCK RATE FOR TRANSMISSION DATA

(71) Applicant: Fujitsu Limited, Kawasaki (JP)

(72) Inventor: Masaki Yamamoto, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/913,010

(22) Filed: Jun. 7, 2013

(65) Prior Publication Data

US 2014/0003565 A1 Jan. 2, 2014

(30) Foreign Application Priority Data

Jun. 28, 2012 (JP) ................................ 2012-145540

(51) Int. Cl.
| | |
|---|---|
| *H04L 5/16* | (2006.01) |
| *H04W 88/08* | (2009.01) |
| *H04L 7/00* | (2006.01) |
| *H04W 56/00* | (2009.01) |

(52) U.S. Cl.
CPC ............. *H04L 7/0087* (2013.01); *H04W 56/00* (2013.01); *H04W 88/085* (2013.01)
USPC ............................................ 375/220; 341/61

(58) Field of Classification Search
CPC .. H04B 10/40; H04B 10/801; H04L 12/2801; H04W 56/0085
USPC ............................... 375/220, 359, 360; 341/61
See application file for complete search history.

(56) References Cited

U.S. PATENT DOCUMENTS

| | | | |
|---|---|---|---|
| 6,965,737 B1* | 11/2005 | Somashekhar | 398/54 |
| 2006/0023079 A1* | 2/2006 | Sugitani | 348/222.1 |
| 2008/0005455 A1* | 1/2008 | Macri et al. | 711/105 |
| 2009/0161738 A1 | 6/2009 | Carvalho et al. | |
| 2010/0244913 A1* | 9/2010 | Golding | 327/156 |

FOREIGN PATENT DOCUMENTS

| | | |
|---|---|---|
| JP | 2007-306362 A | 11/2007 |
| JP | 2009-153132 A | 7/2009 |
| JP | 2009-278571 A | 11/2009 |

OTHER PUBLICATIONS

"Common Public Radio Interface (CPRI); Interface Specification", The Parties; Ericsson AB, Huawei Technologies Co., Ltd., NEC Corp., Alcatel Lucent and Nokia Siemens Networks GmbH & Co. KG, pp. 1-113, Sep. 29, 2010.

* cited by examiner

*Primary Examiner* — Don N Vo
(74) *Attorney, Agent, or Firm* — Arent Fox LLP

(57) ABSTRACT

An apparatus detects, from symbol data of a predetermined communication scheme that is input via a common public radio interface (CPRI) at a first rate indicating a chip rate for the CPRI, a timing at which a clock phase matches between the first rate and a second rate indicating a symbol rate for the predetermined communication scheme, where the CPRI is an internal interface for a radio communication apparatus. The apparatus changes, at the timing, a clock rate for transmitting the symbol data, from the first rate to the second rate.

10 Claims, 14 Drawing Sheets

APPARATUS AND METHOD FOR CHANGING A CLOCK RATE FOR TRANSMISSION DATA

CROSS-REFERENCE TO RELATED APPLICATION

This application is based upon and claims the benefit of priority from the prior Japanese Patent Application No. 2012-145540, filed on Jun. 28, 2012, the entire contents of which are incorporated herein by reference.

FIELD

The embodiments discussed herein are related to apparatus and method for changing a clock rate for transmission data.

BACKGROUND

A global system for mobile communications (GSM) scheme is a communication scheme of the second generation (2G) mobile communication system and employs a time division multiple access (TDMA) scheme. In the GSM scheme, IQ symbol data based on sampling at 270.833 kHz is used. That is, a symbol rate is 270.833 sps (samples/sec).

FIG. 1 is a diagram illustrating an example of a frame structure of a GSM scheme.

In the GSM scheme, one time slot is constituted by 156.25 symbols. That is, the one time slot is 156.25 symbols×1/270.833=576.9 μs.

In the GSM scheme, one TDMA frame is constituted by 8 time slots. That is, the one TDMA frame is equivalent to 576.9 μs×8=4.615 ms.

In the GSM scheme, one multiframe is constituted by 26 TDMA frames. That is, the one multiframe is equivalent to 4.615 ms×26=120 ms.

In the GSM scheme, one superframe is constituted by 51 multiframes. That is, the one superframe is equivalent to 120 ms×51=6.12 s.

In the GSM scheme, one hyperframe is constituted by 2048 superframes. That is, the one hyperframe is equivalent to 6.12 s×2048=12533.76 s.

A radio unit and a baseband unit (BBU) are included in a base station. The radio unit is also referred to as a remote radio head (RRH). In the GSM scheme, the RRH and the BBU are connected to each other with an interface dedicated to symbol transmission.

In recent years, third generation (3G) mobile communication schemes and so-called fourth generation mobile communication schemes have been widely used. Examples of the third generation mobile communication schemes include a code division multiple access (CDMA) scheme and wideband code division multiple access (WCDMA). Examples of the fourth generation mobile communication schemes include long term evolution (LTE) and LTE-Advanced. In third and later generation mobile communication schemes, an interface that connects an RRH and a BBU has been standardized. A common public radio interface (CPRI) is a known example of the standardized interface that connects the RRH and the BBU (see, for example, CPRI Specification V4.2 (September 2010)).

The CPRI is an interface standard for the so-called third and later generation mobile communication schemes.

In the third and later generation mobile communication schemes, IQ symbol data based on sampling at 3.84 MHz is used.

A frame transmitted via the CPRI will be described.

FIG. 2 is a diagram illustrating an example of a basic frame transmitted via a CPRI. FIG. 2 illustrates the case of 1228.8 Mbps. The horizontal axis in FIG. 2 represents time.

The length of a basic frame forming the basis of a frame transmitted via the CPRI is equivalent to 1 Tc=1/3.84 MHz=260.416667 ns. The basic frame includes 16 words. One word among the 16 words is a control word and the other 15 words are IQ symbol data.

In the CPRI, a hyperframe which is formed using 256 basic frames and a radio frame which is formed using 150 hyperframes have been standardized.

SUMMARY

According to an aspect of the embodiment, an apparatus detects, from symbol data of a predetermined communication scheme that is input via a common public radio interface (CPRI) at a first rate indicating a chip rate for the CPRI, a timing at which a clock phase matches between the first rate and a second rate indicating a symbol rate for the predetermined communication scheme, where the CPRI is an internal interface for a radio communication apparatus. The apparatus changes, at the timing, a clock rate for transmitting the symbol data, from the first rate to the second rate.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

The case where a BBU and an RRH are connected to each other via a CPRI and GSM symbol data is transmitted will be discussed.

In the BBU, a clock rate is changed from a GSM symbol rate of 270.833 kHz, to 3.84 MHz that is the chip rate of the CPRI. In addition, in the RRH, a clock rate is changed from 3.84 MHz which is the chip rate of the CPRI, to a GSM symbol rate of 270.833 kHz.

Since a change of a clock rate occurs, the phase relationship between symbol data having a GSM symbol rate of 270.833 kHz that is generated owing to the change of a clock rate in the RRH, and symbol data having a GSM symbol rate of 270.833 kHz in the BBU, is not fixed. Since a phase relationship is not fixed, the phase relationship between clocks varies every time the RRH is started up by a reset operation or the like.

Figure 1:
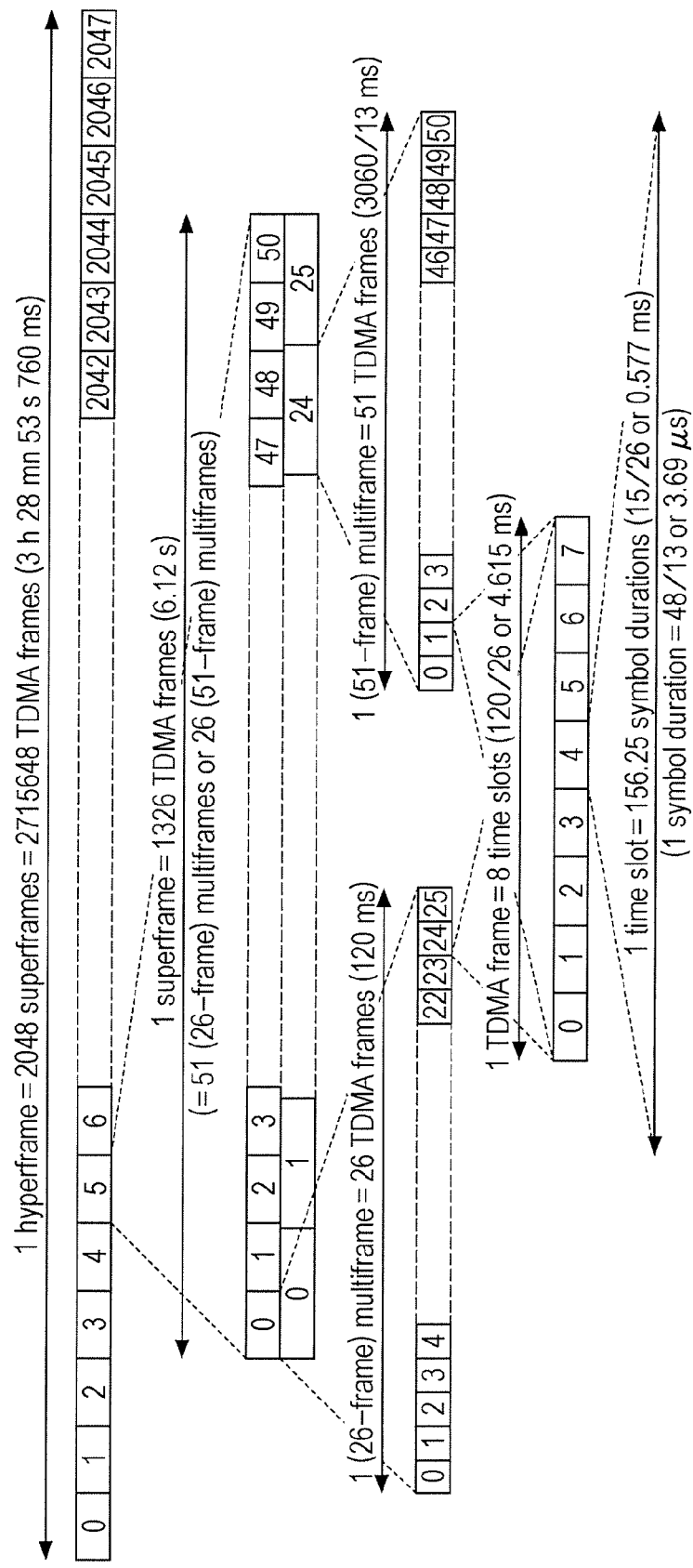
FIG. 1 is a diagram illustrating an example of a frame structure of a global system for mobile communications (GSM) scheme.
Figure 2:
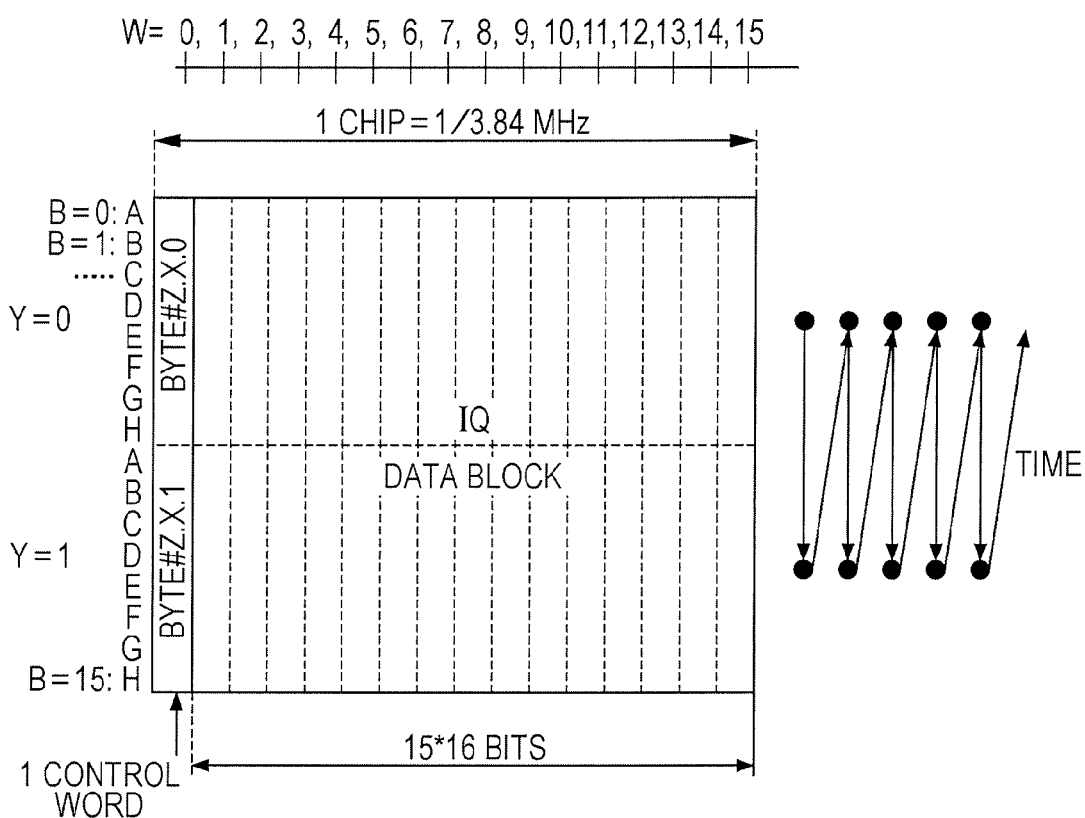
FIG. 2 is a diagram illustrating an example of a basic frame transmitted via a CPRI.
Figure 3:
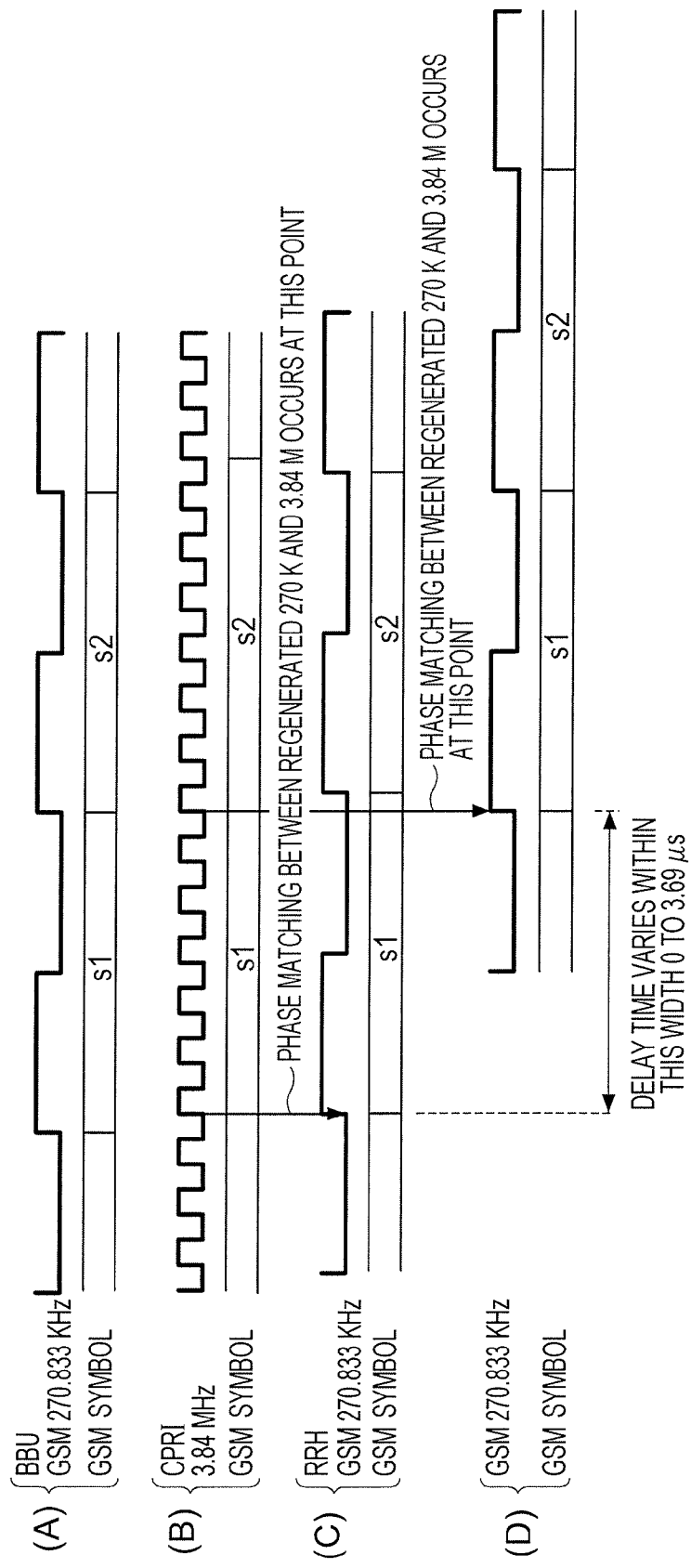
FIG. 3 is a diagram illustrating an example of a phase relationship between symbol data in a baseband unit (BBU) and symbol data in a remote radio head (RRH)

FIG. 3 is a diagram illustrating an example of a phase relationship between symbol data in a BBU and symbol data in a RRH. The horizontal axis in FIG. 3 represents time.

Chart (A) illustrates symbol data before a clock rate is changed by the BBU. GSM symbols "s1" and "s2" are transmitted at a symbol rate of 270.833 kHz.

Chart (B) illustrates symbol data that is transmitted through the CPRI after the change of a clock rate by the BBU has occurred. In the BBU, the change of a clock rate to 3.84 MHz occurs in synchronization with a rise in the level of a clock signal for a symbol rate of 270.833 kHz. That is, the GSM symbols "s1" and "s2" are transmitted at a rate of 3.84 MHz so that transmission thereof is started from a time-point at which a 184 MHz clock signal first rises after the clock signal for a symbol rate of 270.833 kHz has risen.

Charts (C) and (D) each illustrate symbol data after a clock rate has been changed by the RRH. In the RRH, a GSM symbol rate of 270.833 kHz is regenerated from 3.84 MHz that is the chip rate of the CPRI.

Chart (C) illustrates the case where a rise in the level of the clock signal for a rate of 3.84 MHz coincides with a rise in the level of a clock signal for a symbol rate of 270.833 kHz at a timing when the symbol data is input from the CPRI to the RRH. In this case, the phase difference between the 3.84 MHz data transmitted through the CPRI and 270.833 kHz symbol data that is generated owing to the change of a clock rate by the RRH, is zero. In other words, the delay time between the 3.84 MHz symbol data transmitted through the CPRI and the 270.833 kHz symbol data generated owing to the change of a clock rate by the RRH, is approximately zero.

Chart (D) illustrates the case where a rise in the level of the clock signal for a rate of 3.84 MHz does not coincide with a rise in the level of a clock signal for a symbol rate of 270.833 kHz at a timing when the symbol data is input from the CPRI to the RRH and coincides with it after one period of the clock signal for a symbol rate of 270.833 kHz. In this case, the phase difference between the 3.84 MHz symbol data transmitted through the CPRI and 270.833 kHz symbol data generated owing to the change of a clock rate by the RRH, is one period. In other words, the delay time between the 3.84 MHz symbol data transmitted through the CPRI and the 270.833 kHz symbol data generated owing to the change of a clock rate by the RRH, is 1/270.833=3.69 μs.

As illustrated in FIG. 3, the delay time in the RRH with respect to the BBU varies within the range of 0 μs to 3.69 μs, and the delay time is not fixed.

In a mobile communication system, a delay time of an entire system is set based on a delay time between a BBU and an RRH. The stability of communication is maintained under the conditions that the delay time of the entire system is set and control of the entire system is performed in accordance with the set delay time.

However, when the delay time varies every time, for example, the RRH is reset, an amount of delay for the entire system including the BBU and the RRH varies. This makes it difficult to set an amount of delay for the entire system. Failing to set the amount of delay for the entire system causes deterioration of communication quality.

Figure 4:
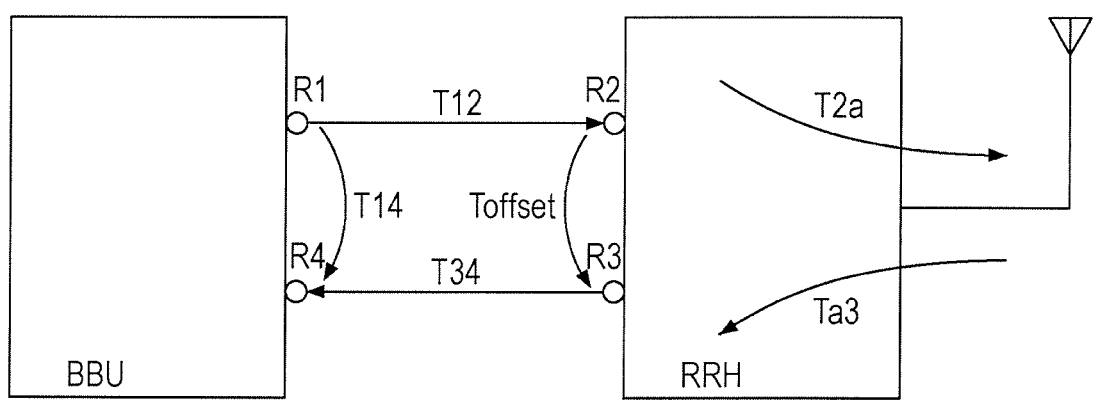
FIG. 4 is a schematic diagram illustrating an example of delay times between a BBU and an RRH.

FIG. 4 is a schematic diagram illustrating an example of delay times between a BBU and an RRH.

In the BBU, "R1" denotes an output point and "R4" denotes an input point.

In the RRH, "R2" denotes an input point and "R3" denotes an output point.

"T12" denotes the delay time of a downlink signal from the output point ("R1") of the BBU to the input point ("R2") of the RRH. "T34" denotes the delay time of an uplink signal from the output point ("R3") of the RRH to the input point ("R4") of the BBU. "Toffset" denotes a frame offset between an input signal at the input point ("R2") of the RRH and an output signal at the output point ("R3") of the RRH. "T14" denotes a frame timing difference between a signal output from the output point ("R1") of the BBU and a signal input to the input point ("R4") of the BBU. "T2a" denotes a time period from when an input signal is input to the input point ("R2") of the RRH to when the input signal is transmitted. "Ta3" denotes a time period from when a signal is received by an antenna to when an output signal is output from the output point ("R3") of the RRH. For example, when the amount of delay for the entire system including the BBU and the RRH varies, "Toffset", "T2a", and "Ta3" vary.

Embodiments will be described below with reference to the drawings. In all figures for describing the embodiments, components having the same functions are designated by the same reference numerals and repeated description thereof is omitted.

Base Station

Figure 5:
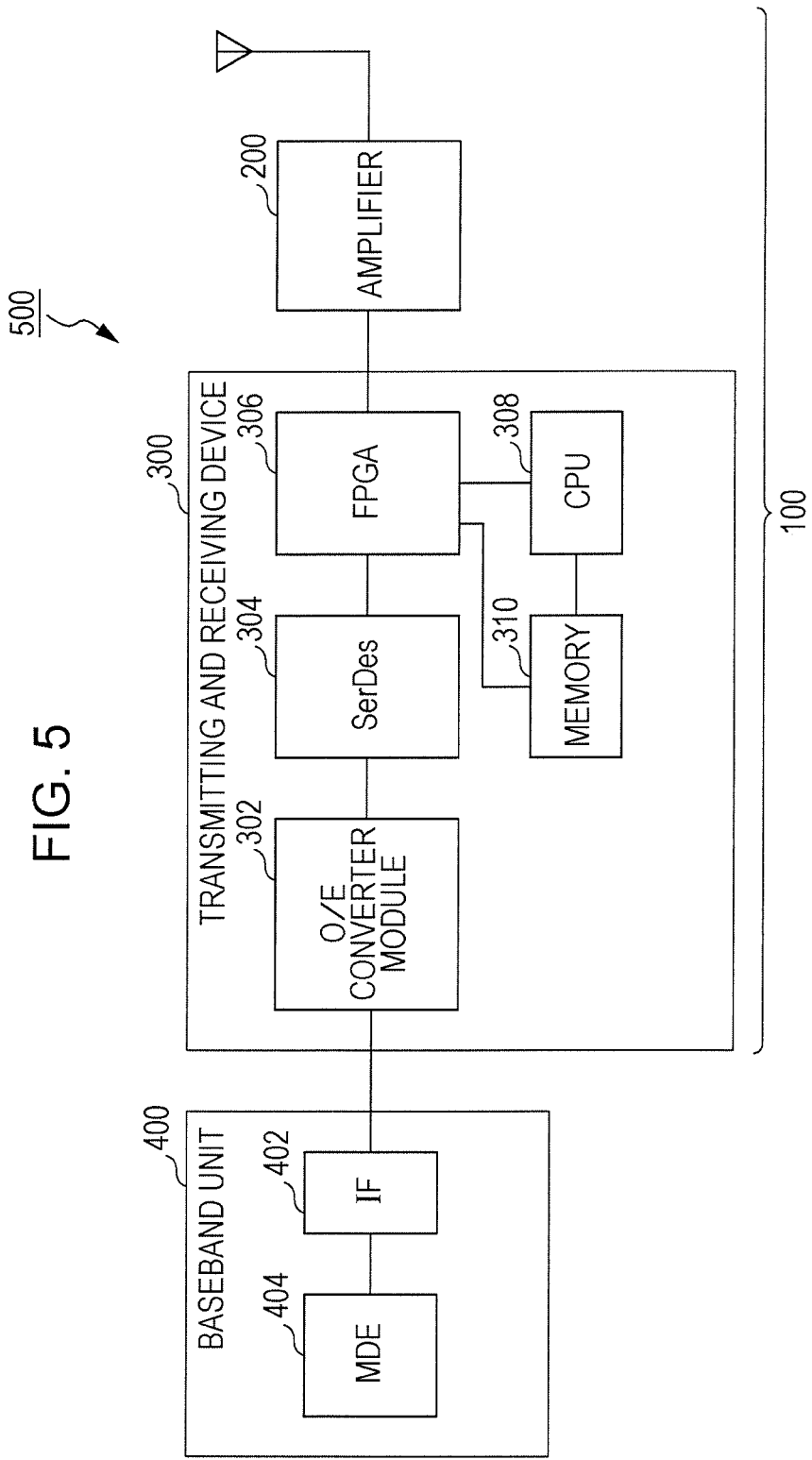
FIG. 5 is a diagram illustrating a configuration example of a base station, according to an embodiment.

FIG. 5 is a diagram illustrating a configuration example of a base station, according to an embodiment. FIG. 5 mainly illustrates a hardware configuration of a base station 500. In this embodiment of the base station 500, GSM symbol data of a GSM scheme is transmitted. This embodiment is not limited to symbol data of the GSM scheme and may also be applied to symbol data of other communication schemes. This embodiment is preferably applied to a communication scheme having a symbol rate different from 3.84 MHz which is the chip rate of a CPRI.

The base station 500 includes a radio device 100 and a baseband unit 400. The radio device 100 includes an amplifier 200 and a transmitting and receiving device 300. The radio device 100 may be also referred to as a remote radio head (RRH). Although FIG. 5 illustrates one radio device 100, two or more radio devices may be provided.

The baseband unit 400 is connected to the transmitting and receiving device 300. For example, the baseband unit 400 and the transmitting and receiving device 300 are connected via a CPRI which is an internal interface of a radio communication apparatus. The baseband unit 400 performs baseband signal processing. The baseband unit 400 performs processing on data which is transmitted and received to and from a network. The baseband unit 400 includes modulation and demodulation equipment (MDE) 404 and an interface (IF) 402. The baseband unit 400 may be implemented by using a digital signal processor (DSP). The baseband unit 400 may also be implemented by using a field programmable gate array (FPGA). Further, the baseband unit 400 may be implemented by using a special purpose large scale integration (LSI) circuit.

The baseband unit 400 transmits GSM symbol data to the transmitting and receiving device 300. When transmitting GSM symbol data to the transmitting and receiving device 300, the baseband unit 400 put the GSM symbol data onto a clock signal of 3.84 MHz in accordance with a rise in the level of a clock signal for a GSM symbol rate of 270.833 kHz. That is, the baseband unit 400 performs change of a clock rate into 3.84 MHz in accordance with a rise in the level of a clock signal for a GSM symbol rate of 270.833 kHz when transmitting GSM symbol data to the transmitting and receiving device 300.

For example, the baseband unit 400 may convert an electrical signal into an optical signal and transmit the optical signal to the transmitting and receiving device 300 via an optical fiber. The baseband unit 400 may also be configured to convert a parallel signal into a serial signal and transmit the serial signal to the transmitting and receiving device 300 via a digital signal transmission line.

In addition, the baseband unit 400 may convert an optical signal from the transmitting and receiving device 300 into an electrical signal and perform processing on the converted electrical signal. The baseband unit 400 may also convert a serial signal from the transmitting and receiving device 300 into a parallel signal and perform processing.

The transmitting and receiving device 300 is a radio unit of the base station 500. The transmitting and receiving device 300 includes, for example, an optical/electrical (O/E) converter module 302, a serializer/deserializer (SerDes) 304, an FPGA 306, a central processing unit (CPU) 308, and a memory 310.

The O/E converter module 302 converts an optical signal from the baseband unit 400 into an electrical signal.

Figure 6:
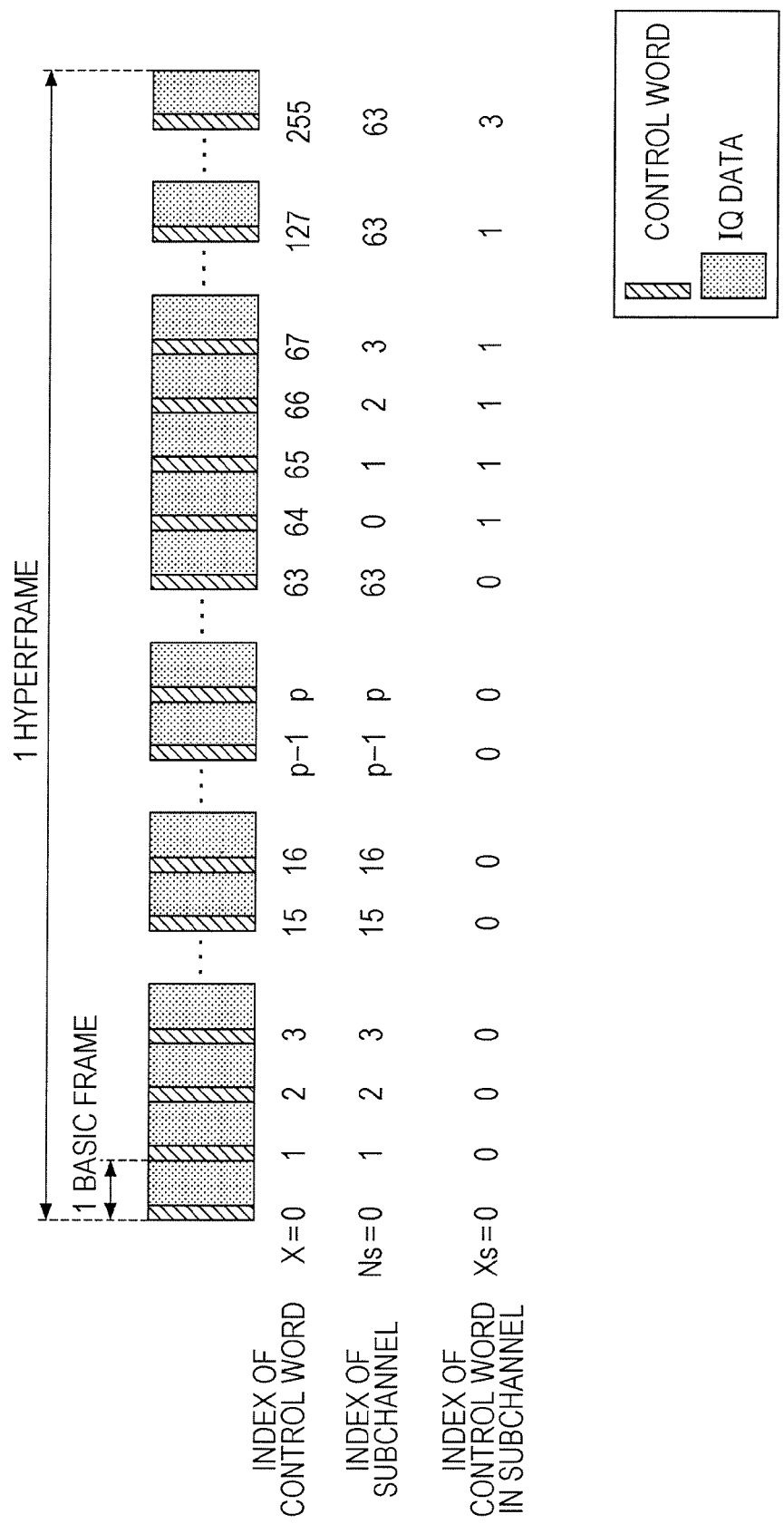
FIG. 6 is a diagram illustrating an example of a frame structure of a serial signal input from a baseband unit to a transmitting and receiving device via a CPRI.

FIG. 6 is a diagram illustrating an example of a frame structure of a serial signal input from a baseband unit to a transmitting and receiving device via a CPRI. FIG. 6 illustrates an example of a hyperframe.

The hyperframe includes a plurality of basic frames. For example, the hyperframe includes 256 basic frames. Each basic frame includes a control word and IQ data. The control word is mapped to a part including the head of the basic frame.

The O/E converter module 302 inputs the electrical signal to the SerDes 304. Signal transmission between the O/E converter module 302 and the SerDes 304 may be performed using a digital cable transmission technique, such as low voltage differential signaling (LVDS).

The SerDes 304 converts the serial electrical signal into a parallel electrical signal. The SerDes 304 inputs the parallel electrical signal to the FPGA 306.

The FPGA 306 performs signal processing so that the phase relationship between the GSM symbol data in the baseband unit 400 and the parallel data from the SerDes 304 does not vary, thereby suppressing variation in delay time which may be caused by variation in the phase relationship.

Figure 7:
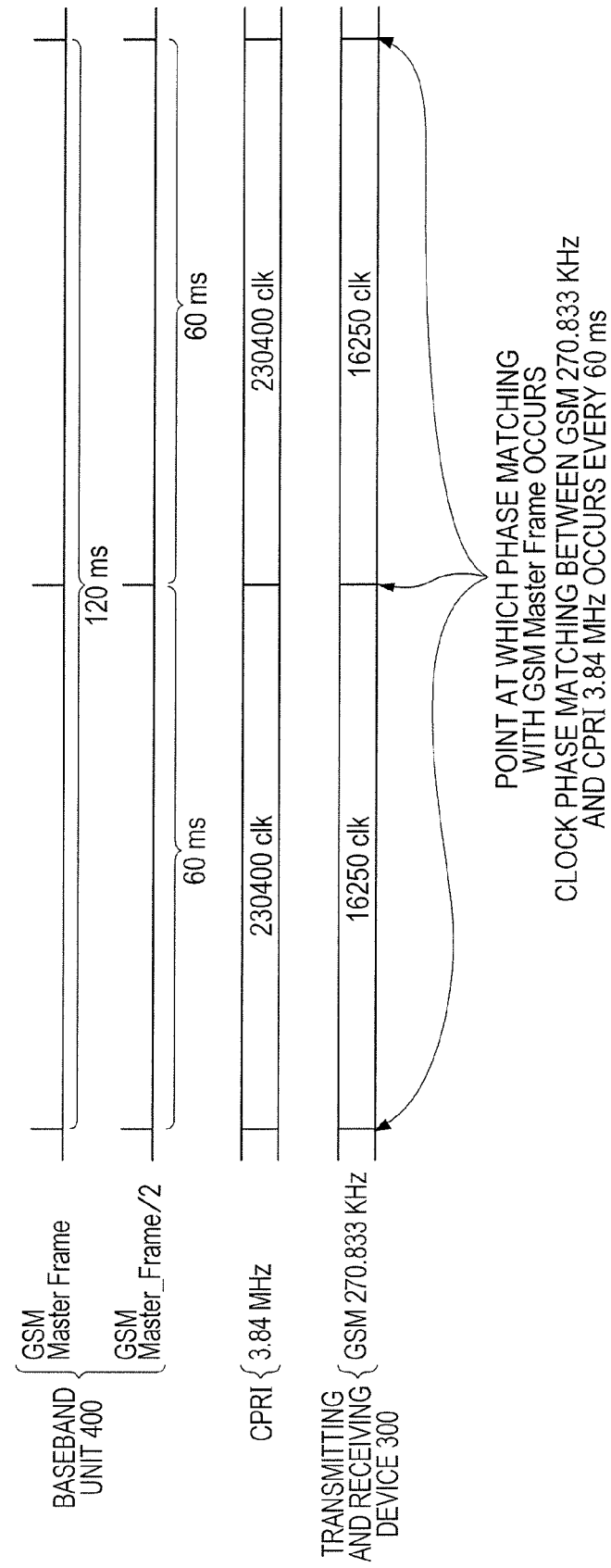
FIG. 7 is a diagram illustrating an example of a phase relationship between a chip rate of a CPRI and a GSM symbol rate.

FIG. 7 is a diagram illustrating an example of a phase relationship between a chip rate of the CPRI and a GSM symbol rate.

A time period for a GSM master frame in the baseband unit 400 is 120 ms. Accordingly, half of the time period for the GSM master frame is 60 ms.

Phase matching between a GSM symbol rate of 270.833 kHz and a chip rate of 3.84 MHz of the CPRI occurs at a period of 1.2 ms in accordance with the principle of a least common multiple. That is, the phase relationship between a GSM symbol and a chip of the CPRI may coincide at a period of 1.2 ms. On the other hand, the phase relationship between a GSM symbol and a chip of the CPRI varies except at a period of 1.2 ms.

In order to set a fixed delay time, the FPGA 306 synchronizes the GSM master frame transmitted via the CPRI with a GSM symbol rate generated in the transmitting and receiving device 300 on the basis of a certain standard. For example, the FPGA 306 synchronizes the GSM master frame transmitted via the CPRI with a GSM symbol rate generated in the transmitting and receiving device 300 at a time that is an integral multiple of 1.2 ms. For example, as the time that is an integral multiple of 1.2 ms, 120 ms, which corresponds to the time period of the GSM master frame, or 60 ms, which corresponds to half of the time period of the GSM master frame, may be used. Hereinafter, "half of the time period of the GSM master frame" will also be abbreviated as "Master_Frame/2".

The above mentioned synchronization allows a clock phase for a GSM symbol rate of 270.833 kHz in the transmitting and receiving device 300 to match a clock phase for a GSM symbol rate of 270.833 kHz in the baseband unit 400. This phase matching allows a delay time that may vary to be fixed.

A clock in the transmitting and receiving device 300 with respect to the GSM symbol data transmitted between the baseband unit 400 and the transmitting and receiving device 300 via the CPRI is matched to a certain standard, thereby setting a fixed delay time. A clock in the transmitting and receiving device 300 may be matched at a time when the radio device 100 is started by a reset operation or the like. By fixing the delay time as mentioned above, an amount of delay for the entire system may be set. This allows control to be performed in accordance with the amount of delay for the entire system, thereby enabling stable communication.

Function of Transmitting and Receiving Device 300
(I)

Figure 8:
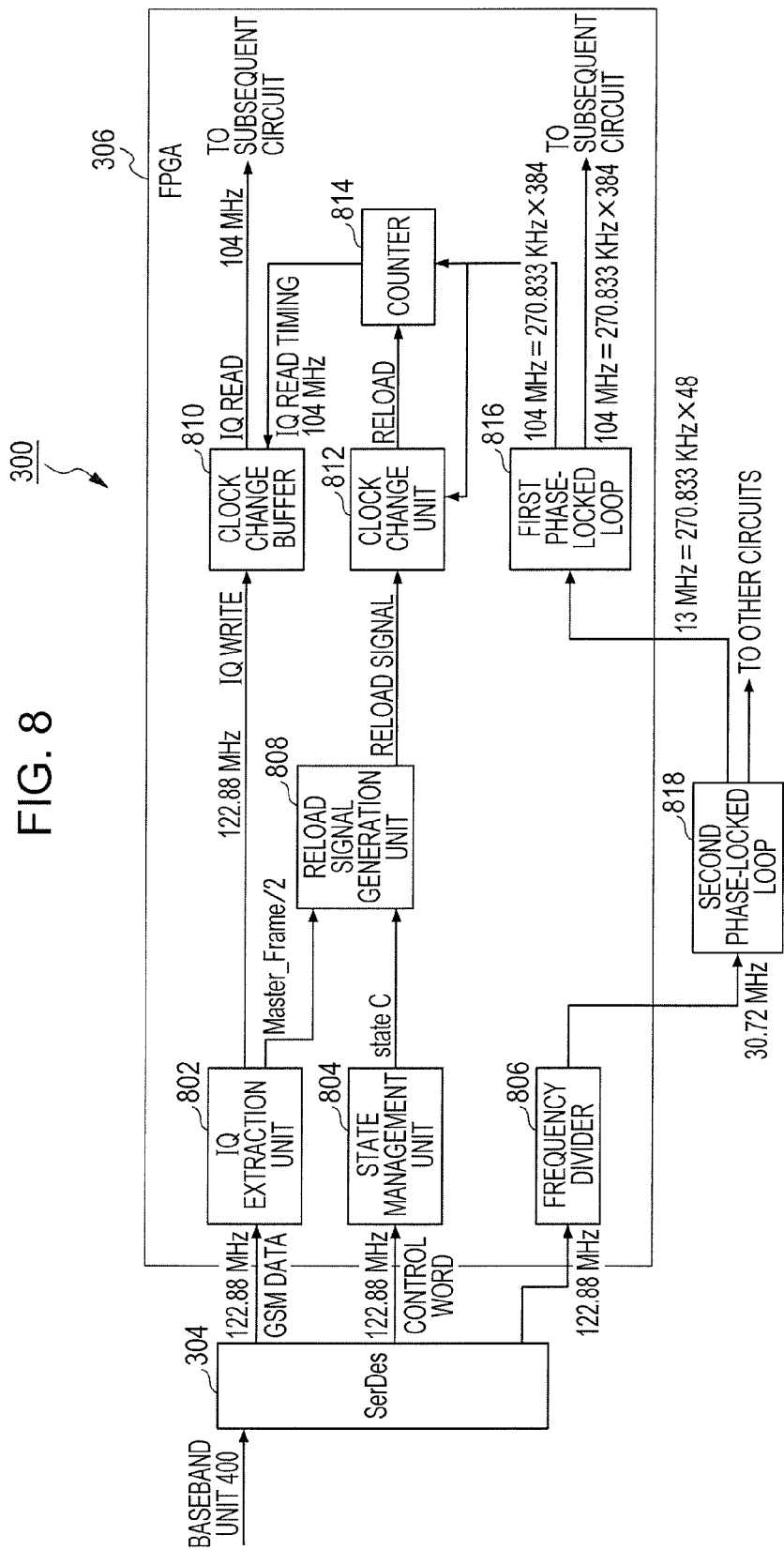
FIG. 8 is a diagram illustrating an example of a functional configuration of a transmitting and receiving device, according to an embodiment.

FIG. 8 is a diagram illustrating an example of a functional configuration of a transmitting and receiving device, according to an embodiment. FIG. 8 mainly illustrates functions performed by the FPGA 306. That is, the FPGA 306 functions in accordance with software (programs) stored in the memory 310 and the functions illustrated in FIG. 8 are thereby performed. The FPGA 306 may also function in accordance with software (firmware) stored in the FPGA 306 and the functions illustrated in FIG. 8 may thereby be performed.

The FPGA 306 functions as an IQ extraction unit 802, a state management unit 804, a frequency divider 806, a reload signal generation unit 808, a clock change buffer 810, a clock change unit 812, a counter 814, and a first phase-locked loop (PLL) 816. The transmitting and receiving device 300 also includes a second phase-locked loop 818.

The SerDes 304 converts a frame transmitted from the baseband unit 400 via the CPRI into a parallel signal and also performs clock data recovery and 8B10B conversion. For example, the SerDes 304 converts a frame transmitted from the baseband unit 400 via the CPRI into GSM data, a control word, and a clock signal and performs 8B10B conversion. The GSM data, the control word, and the clock signal have a 122.88 MHz rate corresponding to 3.84 MHz×32. That is, the SerDes 304 converts a frame transmitted from the baseband unit 400 via the CPRI into 32 parallel signals.

The SerDes 304 inputs the 122.88 MHz GSM data to the IQ extraction unit 802. The SerDes 304 also inputs the 122.88 MHz control word to the state management unit 804. The SerDes 304 also inputs the 122.88 MHz clock signal to the frequency divider 806.

The IQ extraction unit 802 is connected to the SerDes 304. The IQ extraction unit 802 extracts IQ data for the GSM symbol from parallel data of a 122.88 MHz CPRI frame and detects a time period of 60 ms, which corresponds to half of the time period of a GSM master frame. The IQ extraction unit 802 inputs the GSM symbol IQ data to the clock change buffer 810 and also inputs a detection signal of 60 ms to the reload signal generation unit 808. For example, the IQ extraction unit 802 inputs a detection timing signal of 60 ms to the reload signal generation unit 808.

The state management unit 804 is connected to the SerDes 304. The state management unit 804 manages a state of the CPRI. For example, the state management unit 804 detects which one of states A to F the CPRI is in, where the line state of the CPRI improves in the order of states A to F. Hereinafter, a state will be also expressed as "higher state" when the state is latter in the order of states A to F. The states C, D, E, and F, which are equal to or higher than C, indicate that the physical line of the CPRI is in a normal state. When the CPRI is in the state C or higher, the state management unit 804 notifies the reload signal generation unit 808 of the state of the CPRI.

The reload signal generation unit 808 is connected to the IQ extraction unit 802 and the state management unit 804. When the CPRI state input from the state management unit 804 is the state C or higher, the reload signal generation unit 808 generates, in accordance with the detection signal of 60 ms input first from the IQ extraction unit 802, a reload signal to be reloaded into the counter 814. The reload signal generation unit 808 inputs the reload signal to the clock change unit 812.

The frequency divider 806 is connected to the SerDes 304. The frequency divider 806 generates a reference clock to be input to the second phase-locked loop 818 of the transmitting and receiving device 300, where the reference clock is synchronized to a clock signal used in the FPGA 306. For example, the frequency divider 806 divides a clock signal from the SerDes 304 by four into a reference clock of 30.72 MHz (122.88/4 MHz). The frequency divider 806 inputs the 30.72 MHz reference clock signal to the second phase-locked loop 818.

The second phase-locked loop 818 is connected to the frequency divider 806. The second phase-locked loop 818 generates various clocks used in the transmitting and receiving device 300. The second phase-locked loop 818 generates a 13 MHz (270.833 kHz×48) clock signal from the 30.72 MHz reference clock input from the frequency divider 806. The second phase-locked loop 818 inputs the 13 MHz clock signal to the first phase-locked loop 816 and also inputs the 13 MHz clock signal to other circuits.

The first phase-locked loop 816 is connected to the second phase-locked loop 818. The first phase-locked loop 816 generates a 104 MHz (270.833 kHz×384) clock signal using the 13 MHz clock signal from the second phase-locked loop 818 as a reference signal. The first phase-locked loop 816 inputs the 104 MHz clock signal to blocks in which processing is performed at a GSM symbol rate of 270.833 kHz. For example, the first phase-locked loop 816 inputs the 104 MHz clock signal to the clock change unit 812 and the counter 814 and also inputs the 104 MHz clock signal to a subsequent circuit.

The clock change unit 812 is connected to the reload signal generation unit 808 and the first phase-locked loop 816. The clock change unit 812 puts the 122.88 MHz reload signal from the reload signal generation unit 808 onto the 104 MHz clock signal from the first phase-locked loop 816. That is, the clock change unit 812 converts the 122.88 MHz reload signal from the reload signal generation unit 808 into the 104 MHz signal using the 104 MHz clock signal from the first phase-locked loop 816. The clock change unit 812 inputs the reload signal converted into the 104 MHz signal to the counter 814.

The counter 814 is connected to the clock change unit 812 and the first phase-locked loop 816. The counter 814 is a free-running counter that counts up to 384 (0 to 383) at 104 MHz. The time period taken to count up to 384 is equal to the time period of one 270.833 kHz clock (3.69 μs). The counter 814 inputs a timing signal with which the IQ data is read to the clock change buffer 810 every time the counter 814 counts up to 384.

When the CPRI is in the state C or higher, the counter 814 is synchronized to the reload signal input every 60 ms on the basis of the reload signal. Subsequently, the counter 814 continually runs as long as the CPRI is not in the state B or lower. That is, every time one cycle of the count is completed, the counter 814 is synchronized to half of the time period of the GSM master frame from the baseband unit 400, and symbol data having a symbol rate of 270.833 kHz may be generated. Hence, a delay time may be set at a fixed time and an IQ read data timing in the clock change buffer 810 may be generated from this symbol rate of 270.833 kHz.

The clock change buffer 810 is connected to the IQ extraction unit 802 and the counter 814. The clock change buffer 810 put the 122.88 MHz GSM symbol IQ data input from the IQ extraction unit 802 onto the 104 MHz clock signal. That is, the clock change buffer 810 converts the 122.88 MHz GSM symbol IQ data input from the IQ extraction unit 802 into 104 MHz data. The GSM symbol IQ data changed into the 104 MHz data in the clock change buffer 810 is input to a subsequent circuit.

The CPU 308 processes, in accordance with a program stored in the memory 310, a control word included in a serial signal input from the baseband unit 400 via the CPRI. For example, data for soft communications is included in the control word.

The memory 310 stores programs used when the CPU 308 processes the data for soft communications and programs used by the FPGA 306.

The amplifier 200 amplifies data from the transmitting and receiving device 300 and transmits the data from an antenna.

Operation Performed by Base Station 500

Figure 9:
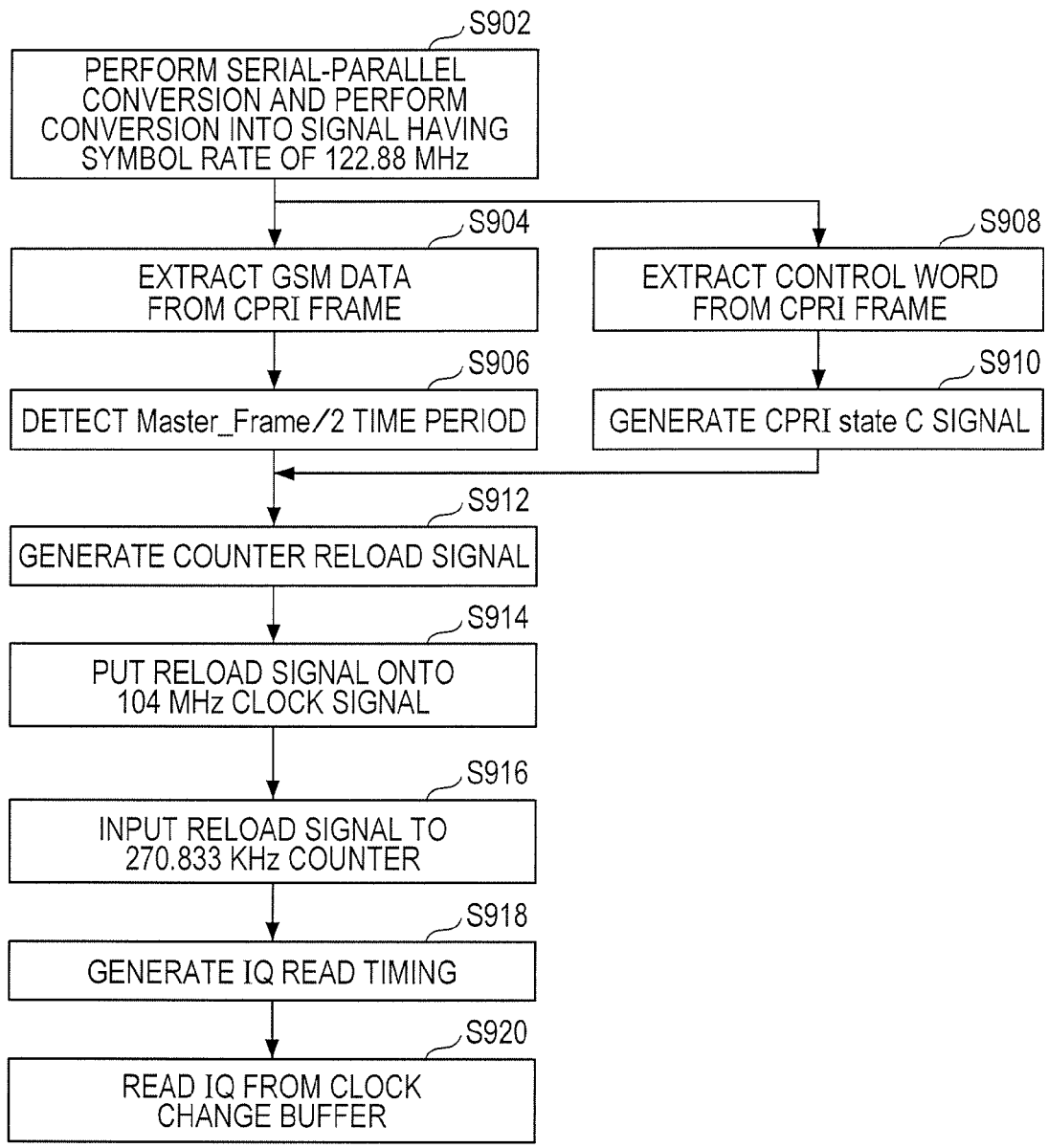
FIG. 9 is a diagram illustrating an example of an operational flowchart performed by a base station, according to an embodiment.

FIG. 9 is a diagram illustrating an example of an operational flowchart performed by a base station, according to an embodiment. FIG. 9 mainly illustrates the operation performed by the transmitting and receiving device 300 included in the base station 500.

In step S902, the SerDes 304 converts a frame transmitted from the baseband unit 400 via the CPRI into a parallel signal and also converts the parallel signal into a signal having a symbol rate of 122.88 MHz. The SerDes 304 generates parallel data of a 122.88 MHz CPRI frame from a 2.4 GHz CPRI frame.

In step S904, the IQ extraction unit 802 extracts GSM symbol IQ data from the parallel data of the 122.88 MHz CPRI frame.

In step S906, the IQ extraction unit 802 detects a time period of 60 ms (Master_Frame/2), which is half of the time period of a GSM master frame.

In step S908, the state management unit 804 extracts a control word from the CPRI frame.

In step S910, the state management unit 804 extracts information representing the state of the CPRI from the control word extracted from the CPRI frame. When the CPRI is in the state C or higher, the state management unit 804 generates a state C signal.

In step S912, the reload signal generation unit 808 receives a timing of half of the time period of the GSM master frame from the IQ extraction unit 802 and state information from the state management unit 804 when the CPRI is in the state C or higher. The reload signal generation unit 808 then generates a reload signal on the basis of the timing of half of the time period of the GSM master frame and the state information. For example, when the CPRI state input from the state management unit 804 is the state C or higher, the reload signal generation unit 808 generates, in accordance with a detection signal of 60 ms input first from the IQ extraction unit 802, a reload signal to be reloaded into the counter 814.

In step S914, the clock change unit 812 puts the 122.88 MHz reload signal from the reload signal generation unit 808 onto a 104 MHz clock signal from the first phase-locked loop 816.

In step S916, the clock change unit 812 inputs the reload signal put onto the 104 MHz clock signal to the counter 814 for counting 270.833 kHz.

In step S918, the counter 814 inputs a timing signal with which the IQ data is read, to the clock change buffer 810 every time the counter 814 counts up to 384. The time period taken to count up to 384 is equal to the time period of one 270.833 kHz clock (3.69 μs).

In step S920, the clock change buffer 810 puts the 122.88 MHz GSM symbol IQ data input from the IQ extraction unit 802 onto 104 MHz clock signal. The clock change buffer 810 reads the IQ data in accordance with an IQ read data timing from the counter 814.

Figure 10:
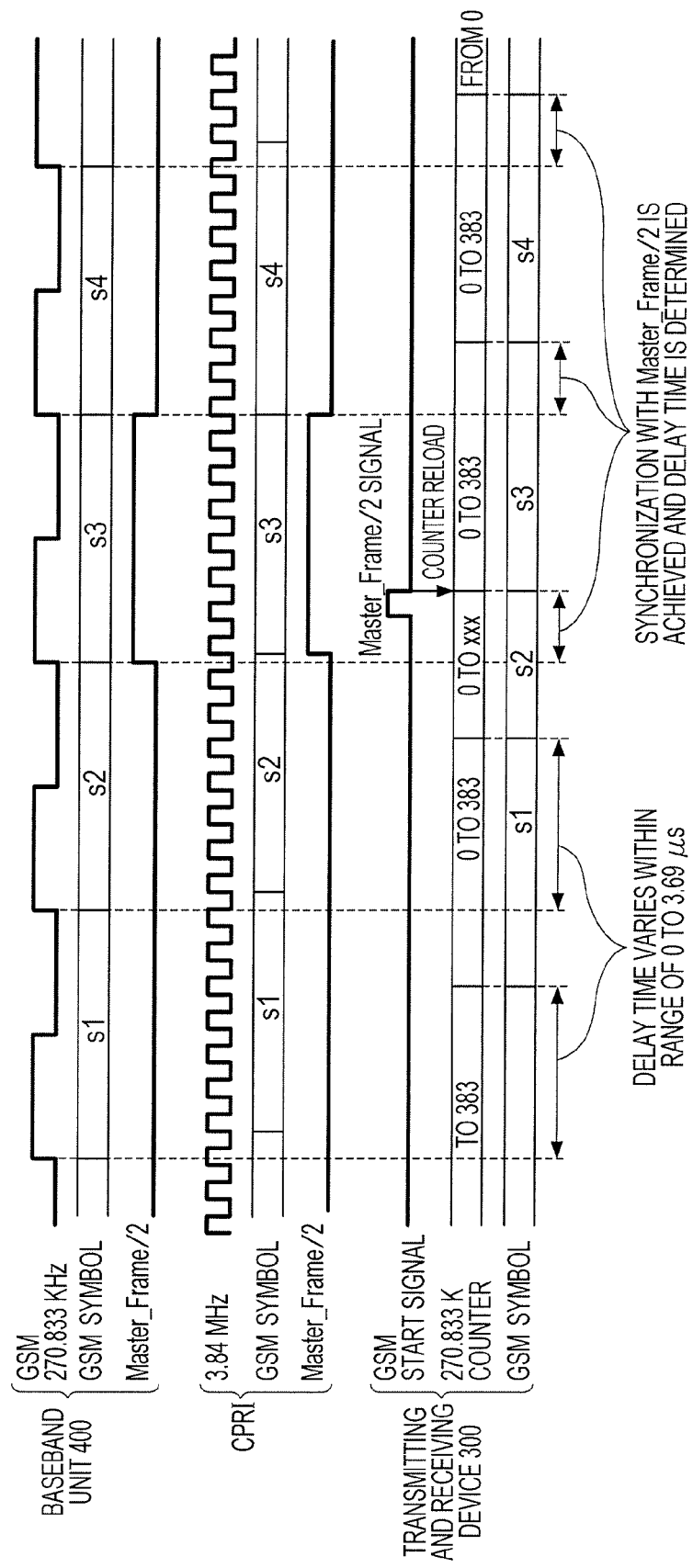
FIG. 10 is a diagram illustrating an example of a clock relationship among a baseband unit, a CPRI, and a transmitting and receiving device, according to an embodiment.

FIG. 10 is a diagram illustrating an example of a clock relationship among a baseband unit, a CPRI, and a transmitting and receiving device, according to an embodiment.

Before a clock change occurs, the baseband unit 400 processes GSM symbols "s1", "s2", "s3", and "s4" at a symbol rate of 270.833 kHz.

The baseband unit 400 performs change of a clock rate. The baseband unit 400 performs change of a clock rate into a symbol rate of 3.84 MHz in accordance with a rise in the level of a clock signal having a symbol rate of 270.833 kHz. That is, the GSM symbols "s1", "s2", "s3", and "s4" are transmitted at a symbol rate of 3.84 MHz so that transmission thereof is started from a time-point at which a 3.84 MHz clock signal first rises after the clock signal for a symbol rate of 270.833 kHz has risen.

The transmitting and receiving device 300 regenerates a GSM symbol rate of 270.833 kHz from 3.84 MHz which is the chip rate of the CPRI. The IQ extraction unit 802 detects a time period of 60 ms, which is half of the time period of a GSM master frame, from 122.88 MHz GSM data corresponding to 3.84 MHz×32, and provides notification of a timing of the 60 ms. When the reload signal generation unit 808 is notified of the CPRI state from the state management unit 804, the reload signal generation unit 808 outputs a counter reload signal in accordance with the timing notified from the IQ extraction unit 802. Then, the counter reload signal is put onto a 104 MHz clock signal from the first phase-locked loop 816 and is input to the counter 814.

The counter 814 starts counting from zero in accordance with the counter reload signal.

In the clock relationships illustrated in FIG. 10, the counter 814 may be configured to start when the counter reload signal is input. That is, the counter 814 starts counting from zero when the counter reload signal is input. The operation of the counter 814 is stopped until the counter reload signal is input. This allows power consumption to be reduced.

In accordance with this embodiment, in the transmitting and receiving device 300, a read timing of the GSM data is controlled in accordance with half of the time period of the GSM master frame that is detected from a signal input from the baseband unit 400. This allows the transmitting and receiving device 300 to read the GSM data after a fixed time period has elapsed since the GSM data was input to the baseband unit 400. That is, since the time period from when the GSM data is input to the baseband unit 400 to when the GSM data is read does not vary, an amount of delay for the entire system including the baseband unit 400 and the transmitting and receiving device 300 may be appropriately set.

Function of Transmitting and Receiving Device 300
(II)

Figure 11:
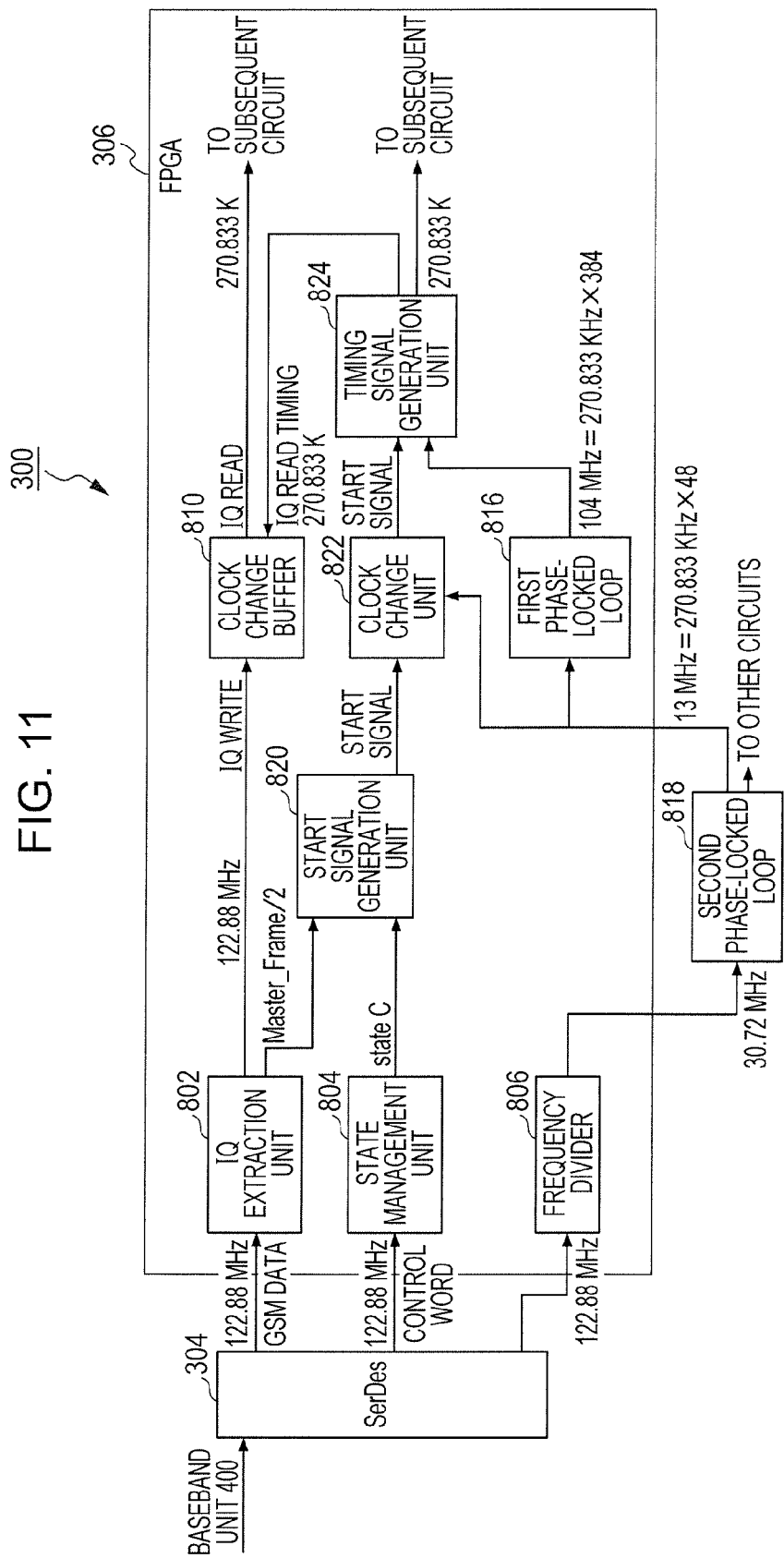
FIG. 11 is a diagram illustrating an example of a functional configuration of a transmitting and receiving device, according to an embodiment.

FIG. 11 is a diagram illustrating an example of a functional configuration of a transmitting and receiving device, according to an embodiment. FIG. 11 mainly illustrates functions performed by the FPGA 306. That is, the functions illustrated in FIG. 11 are performed by causing the FPGA 306 to function in accordance with software (programs) stored in the memory 310. The functions illustrated in FIG. 11 may also performed by causing the FPGA 306 to function in accordance with software (programs) stored in the FPGA 306.

The FPGA 306 may be configured to function as the IQ extraction unit 802, the state management unit 804, the frequency divider 806, a start signal generation unit 820, the clock change buffer 810, a clock change unit 822, a timing signal generation unit 824, and the first phase-locked loop 816. The transmitting and receiving device 300 further includes the second phase-locked loop 818.

The SerDes 304 converts a frame transmitted from the baseband unit 400 via the CPRI into a parallel signal, and also performs clock data recovery and 8B10B conversion. For example, the SerDes 304 converts a frame transmitted from the baseband unit 400 via the CPRI into GSM data, a control word, and a clock signal, and further performs 8B10B conversion. The GSM data, the control word, and the clock signal have a 122.88 MHz rate corresponding to 3.84 MHz×32. That is, the SerDes 304 converts a frame transmitted from the baseband unit 400 via the CPRI into 32 parallel signals.

The SerDes 304 inputs the 122.88 MHz GSM data to the IQ extraction unit 802. The SerDes 304 also inputs the 122.88 MHz control word to the state management unit 804. The SerDes 304 also inputs the 122.88 MHz clock signal to the frequency divider 806.

The IQ extraction unit 802 is connected to the SerDes 304. The IQ extraction unit 802 extracts GSM symbol IQ data from parallel data of a 122.88 MHz CPRI frame and detects a time period of 60 ms (Master_Frame/2), which is half of the time period of a GSM master frame. The IQ extraction unit 802 inputs the GSM symbol IQ data to the clock change buffer 810 and also inputs a detection signal of 60 ms to the start signal generation unit 820.

The state management unit 804 is connected to the SerDes 304. The state management unit 804 manages the state of the CPRI. For example, the state management unit 804 detects which one of states A to F the CPRI is in. When the CPRI is in the state C or higher, the state management unit 804 notifies the start signal generation unit 820 of the CPRI state.

The start signal generation unit 820 is connected to the IQ extraction unit 802 and the state management unit 804. The start signal generation unit 820 receives the CPRI state from the state management unit 804 when the CPRI is in the state C or higher. When the CPRI state is input, the start signal generation unit 820 generates, in accordance with the detection signal of 60 ms that is input first from the IQ extraction unit 802, a signal for starting a phase shift by a delay time corresponding to 270.833 kHz (hereinafter referred to as "start signal"). The start signal generation unit 820 inputs the start signal to the clock change unit 822.

The frequency divider 806 is connected to the SerDes 304. The frequency divider 806 generates a reference clock to be input to the second phase-locked loop 818 of the transmitting and receiving device 300, where the reference clock is synchronized to a clock signal used in the FPGA 306. For example, the frequency divider 806 divides a clock signal from the SerDes 304 by four into a reference clock of 30.72 MHz (122.88/4 MHz). The frequency divider 806 inputs the 30.72 MHz reference clock signal to the second phase-locked loop 818.

The second phase-locked loop 818 is connected to the frequency divider 806. The second phase-locked loop 818 generates various clocks used in the transmitting and receiving device 300. The second phase-locked loop 818 generates a 13 MHz (270.833 kHz×48) clock signal from the 30.72 MHz reference clock input from the frequency divider 806. The second phase-locked loop 818 inputs the 13 MHz clock signal to the first phase-locked loop 816 and the clock change unit 822, and also inputs the 13 MHz clock signal to other circuits.

The clock change unit 822 is connected to the start signal generation unit 820 and the second phase-locked loop 818. The clock change unit 822 puts, in accordance with the 13 MHz clock signal input from the second phase-locked loop 818, the 122.88 MHz start signal input from the start signal generation unit 820 onto a 13 MHz clock signal, and inputs the start signal put onto the 13 MHz clock signal to the timing signal generation unit 824.

The first phase-locked loop 816 is connected to the second phase-locked loop 818. The first phase-locked loop 816 generates a 104 MHz (270.833 kHz×384) clock signal using the 13 MHz clock signal from the second phase-locked loop 818 as a reference signal. The first phase-locked loop 816 inputs the 104 MHz clock signal to the timing signal generation unit 824.

The timing signal generation unit 824 is connected to the clock change unit 822 and the first phase-locked loop 816. The timing signal generation unit 824 starts counting for a 270.833 kHz in accordance with a timing at which the start signal is input from the clock change unit 822. That is, the timing signal generation unit 824 generates a clock for GSM from a timing at which the start signal is input. The timing signal generation unit 824 inputs a read timing signal to the clock change buffer 810 at a timing at which the counting for the 270.833 kHz is completed.

The clock change buffer 810 is connected to the IQ extraction unit 802 and the timing signal generation unit 824. The clock change buffer 810 puts, in accordance with a read timing from the timing signal generation unit 824, the 122.88 MHz GSM symbol IQ data input from the IQ extraction unit 802 onto 104 MHz clock signal. That is, the clock change buffer 810 converts, in accordance with a read timing from the timing signal generation unit 824, the 122.88 MHz GSM symbol IQ data input from the IQ extraction unit 802 into 104 MHz data. The GSM symbol IQ data that has been put onto the 104 MHz clock signal in the clock change buffer 810 is input to a subsequent circuit.

Operation performed by Base Station 500

Figure 12:
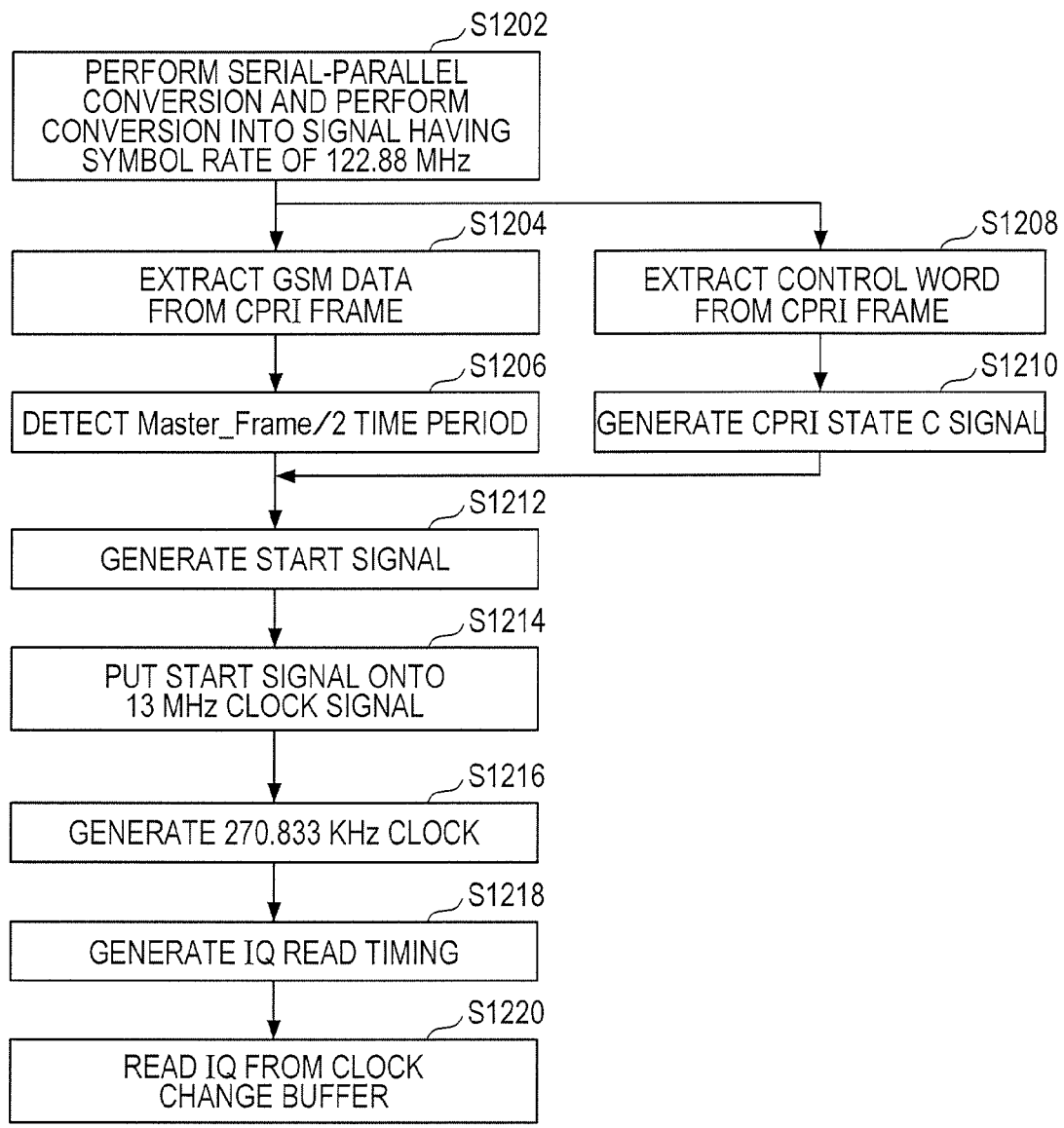
FIG. 12 is a diagram illustrating an example of an operational flowchart performed by a base station, according to an embodiment.

FIG. 12 is a diagram illustrating an example of an operational flowchart performed by a base station, according to an embodiment. FIG. 12 mainly illustrates the operation performed by the transmitting and receiving device 300 included in the base station 500.

Steps S1202 to S1210 are substantially the same as steps S902 to S910 in FIG. 9.

In step S1212, the start signal generation unit 820 receives a timing of half of the time period of the GSM master frame from the IQ extraction unit 802 and state information from the state management unit 804 when the CPRI is in the state C or higher. The start signal generation unit 820 generates a start signal on the basis of the timing of half of the time period of the GSM master frame and the state information. For example, when the CPRI state input by the state management unit 804 is the state C or higher, the start signal generation unit 820 generates a start signal, in accordance with a detection signal of 60 ms input first from the IQ extraction unit 802.

In step S1214, the clock change unit 822 puts the start signal from the start signal generation unit 820 onto a 13 MHz clock signal from the second phase-locked loop 818.

In step S1216, the timing signal generation unit 824 generates a 270.833 kHz clock.

In step S1218, the timing signal generation unit 824 inputs a timing signal with which IQ data is read to the clock change buffer 810 every time a delay time for 270.833 kHz elapses.

In step S1220, the clock change buffer 810 puts 122.88 MHz GSM symbol IQ data input from the IQ extraction unit 802 onto 104 MHz clock signal. The clock change buffer 810 reads the IQ data in accordance with an IQ read timing from the timing signal generation unit 824.

Figure 13:
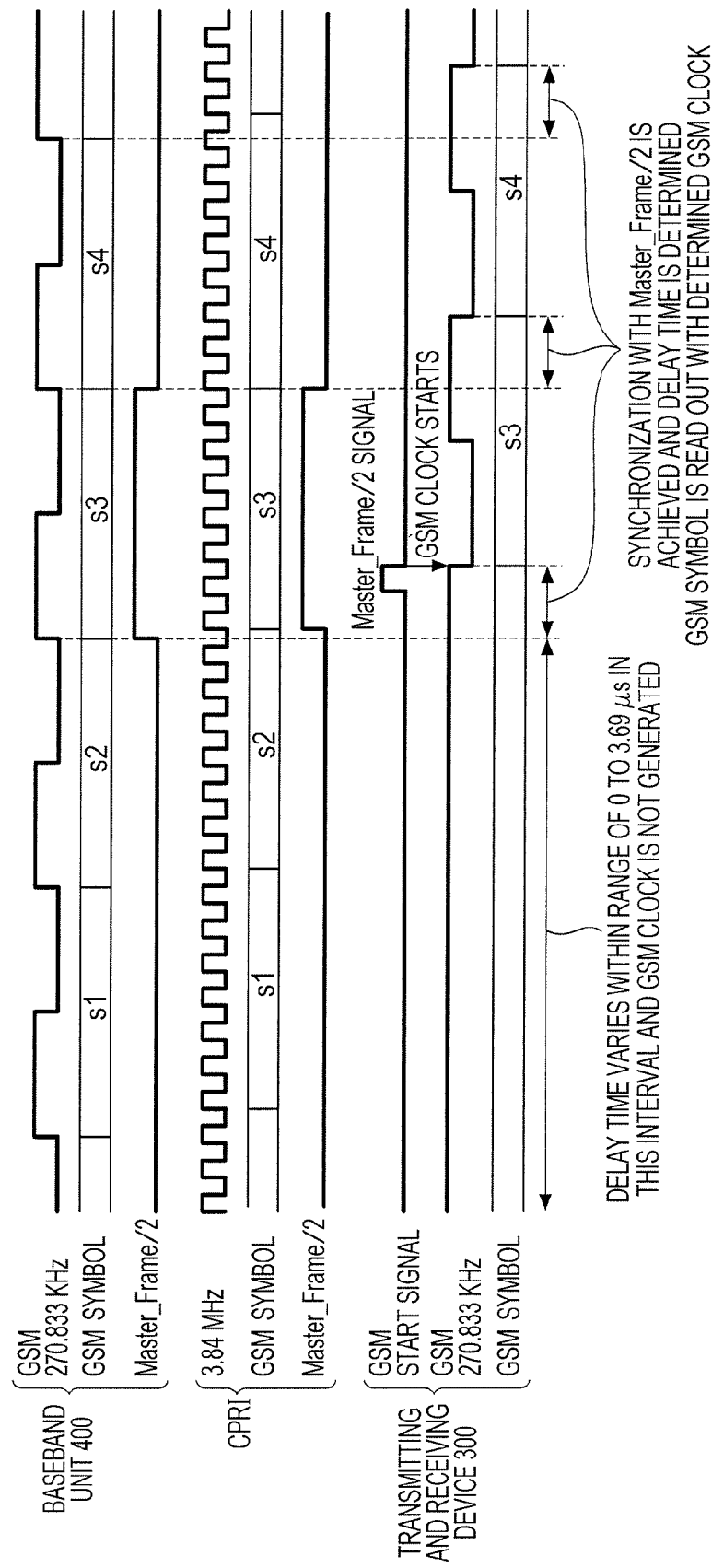
FIG. 13 is a diagram illustrating an example of a clock relationship among a baseband unit, a CPRI, and a transmitting and receiving device, according to an embodiment.

FIG. 13 is a diagram illustrating an example of a clock relationship among a baseband unit, a CPRI, and a transmitting and receiving device, according to an embodiment.

Before a clock change occurs, the baseband unit 400 processes GSM symbols "s1", "s2", "s3", and "s4" at a symbol rate of 270.833 kHz.

The baseband unit 400 performs a change of a clock. The baseband unit 400 performs a clock change into a symbol rate of 3.84 MHz in accordance with a rise in the level of a clock signal having a symbol rate of 270.833 kHz. That is, the GSM symbols "s1", "s2", "s3", and "s4" are transmitted at a symbol rate of 3.84 MHz so that transmission thereof is started from a time-point at which a 3.84 MHz clock signal first rises after the clock signal for a symbol rate of 270.833 kHz has risen.

The transmitting and receiving device 300 regenerates a GSM symbol rate of 270.833 kHz from 3.84 MHz that is the chip rate of the CPRI. The IQ extraction unit 802 detects a time period of 60 ms (Master_Frame/2), which is half of the time period of a GSM master frame, from 122.88 MHz GSM data corresponding to 3.84 MHz×32, and provides notification of a timing of the 60 ms. When the start signal generation unit 820 is notified of the CPRI state from the state management unit 804, the start signal generation unit 820 outputs a start signal in accordance with the timing notified from the IQ extraction unit 802. The start signal is put onto a 13 MHz clock signal from the second phase-locked loop 818 and is input to the timing signal generation unit 824.

The timing signal generation unit 824 generates a 270.833 kHz clock in accordance with the start signal.

In accordance with the embodiment, in the transmitting and receiving device 300, a read timing of the GSM data is controlled in accordance with half of the time period of the GSM master frame detected from a signal input from the baseband unit 400. This allows the transmitting and receiving device 300 to read the GSM data after a fixed time period has elapsed since the GSM data was input to the baseband unit 400. That is, since the time period from when the GSM data is input to the baseband unit 400 to when the GSM data is read does not vary, an amount of delay for the entire system including the baseband unit 400 and the transmitting and receiving device 300 may be appropriately set.

In addition, in accordance with the embodiment, in 3G and later mobile communication schemes, symbol data of a 2G mobile communication scheme may be transmitted using a CPRI. Accordingly, in the case of combination of LTE and GSM or combination of WCDMA and GSM, both LTE and GSM or both WCDMA and GSM may be concurrently used in the RRH by utilizing the CPRI without configuring a RRH so that symbols are independently transmitted and processed.

Figure 14:
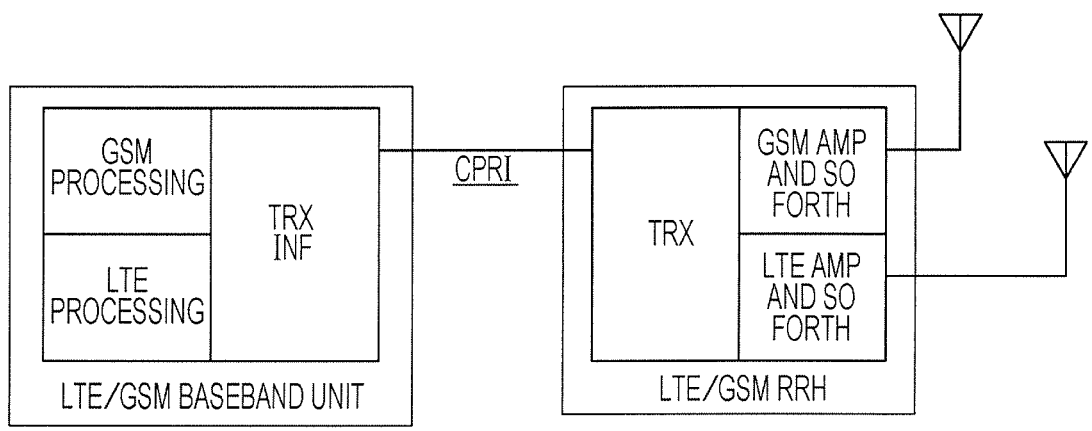
FIG. 14 is a diagram illustrating a configuration example of a base station in which both LTE and GSM are used, according to an embodiment.

FIG. 14 is a diagram illustrating a configuration example of a base station in which both LTE and GSM are used, according to an embodiment. Since symbol data of the 2G mobile communication scheme is transmitted using a CPRI, LTE and GSM may be concurrently used in both a baseband unit and an RRH. This applies to the case where both WCDMA and GSM are used as well.

GSM is a mobile communication system that has a 70 to 80% share of the global mobile phone market. When a mobile communication scheme shifts from 2G to 3G or later, in the process of constructing a base station equipped with both a 2G system and a 3G or later system, for example, the embodiment makes it unnecessary to perform construction of cables dedicated to the 3G or later system and an RRH attached to the system, and removal of disused RRH and cables for the 2G system, thereby providing significant cost benefits.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A radio device comprising:
   at least one processor configured:
   to detect, from symbol data of a predetermined communication scheme that is input via a common public radio interface (CPRI) at a first rate indicating a chip rate for the CPRI, a first timing at which a clock phase matches between the first rate and a second rate indicating a symbol rate for the predetermined communication scheme, the CPRI being an internal interface for a radio communication apparatus; and
   to change, at the first timing, a clock rate for transmitting the symbol data, from the first rate to the second rate.

2. The radio device of claim 1, wherein,
   at the first timing, the at least one processor changes the clock rate to the second rate by reloading the symbol data.

3. The radio device of claim 1, wherein,
   at the first timing, the at least one processor starts a process of changing the clock rate to the second rate.

4. The radio device of claim 1, wherein,
   the at least one processor detects a line state for the CPRI from the symbol data; and
   the at least one processor changes the clock rate to the second rate when it is determined that the line state is equal to or better than a predetermined state.

5. The radio device of claim 1, wherein,
   the at least one processor detects a line state for the CPRI from the symbol data; and
   the at least one processor changes the clock rate to the second rate at a second timing just after it is determined that the line state is equal to or better than a predetermined state.

6. The radio device of claim 1, further comprising:
   an amplifier that amplifies the symbol data whose clock rate has been changed to the second rate.

7. The radio device of claim 1, wherein
   the predetermined communication scheme is a communication scheme for a second generation mobile communication system.

8. The radio device of claim 1, wherein
   the predetermined communication scheme is a communication scheme for a second generation mobile communication system; and
   the first timing is determined as a timing matching an integral multiple of a least common multiple of the first and second rates.

9. A signal processing method comprising:
   detecting, from symbol data of a predetermined communication scheme that is input via a common public radio interface (CPRI) at a first rate indicating a chip rate for the CPRI, a timing at which a clock phase matches between the first rate and a second rate indicating a symbol rate for the predetermined communication scheme, the CPRI being an internal interface for a radio communication apparatus; and
   changing, at the timing, a clock rate for transmitting the symbol data, from the first rate to the second rate.

10. An apparatus comprising:
    a signal processing circuit configured:
    to detect, from symbol data of a predetermined communication scheme that is input via a common public radio interface (CPRI) at a first rate indicating a chip rate for the CPRI, a timing at which a clock phase matches between the first rate and a second rate indicating a symbol rate for the predetermined communication scheme, the CPRI being an internal interface for a radio communication apparatus; and
    to change, at the timing, a clock rate for transmitting the symbol data, from the first rate to the second rate.

* * * * *